(12) United States Patent
Suzuki et al.

(10) Patent No.: US 6,320,288 B1
(45) Date of Patent: Nov. 20, 2001

(54) BRUSHLESS DC MOTOR

(75) Inventors: Yuzuru Suzuki, Hamana-gun; Sakae Fujitani, Hamakita; Taketoshi Ohyashiki, Shizuoka; Kenichi Makino, Nagano, all of (JP)

(73) Assignee: Minebea Co., Ltd., Nagano (JP)

( * ) Notice: Subject to any disclaimer, the term of this patent is extended or adjusted under 35 U.S.C. 154(b) by 641 days.

(21) Appl. No.: 08/609,943

(22) Filed: Feb. 29, 1996

(30) Foreign Application Priority Data

Mar. 3, 1995 (JP) .................................................. 7-044645

(51) Int. Cl.⁷ .............................. H02K 11/00; H02K 1/14
(52) U.S. Cl. ........................................ 310/68 B; 310/67 R
(58) Field of Search ................................ 310/68 B, 67 R, 310/154, 254; 360/98.07, 99.04, 99.08

(56) References Cited

U.S. PATENT DOCUMENTS

| | | | |
|---|---|---|---|
| 3,483,456 | * | 12/1969 | Brunner et al. ........................ 318/138 |
| 3,651,276 | * | 3/1972 | Clark ............................. 179/100.2 T |
| 4,039,912 | * | 8/1977 | Wada .................................... 318/254 |
| 4,394,594 | * | 7/1983 | Schmider et al. .................. 310/68 R |
| 4,739,203 | * | 4/1988 | Miyao et al. ...................... 310/67 R |
| 4,745,345 | * | 5/1988 | Petersen ............................... 318/254 |
| 4,751,415 | * | 6/1988 | Kitamori et al. .................... 310/156 |
| 4,779,148 | * | 10/1988 | Ozawa .................................... 360/77 |
| 4,843,500 | * | 6/1989 | Elsasser et al. .................... 360/97.02 |
| 4,896,311 | * | 1/1990 | Ishihara .................................. 369/47 |
| 5,008,573 | | 4/1991 | Beppu et al. ....................... 310/67 R |
| 5,124,604 | * | 6/1992 | Swartz ................................. 310/68 B |
| 5,164,622 | * | 11/1992 | Kordik ................................ 310/67 R |
| 5,193,146 | * | 3/1993 | Kohmo .................................. 388/811 |
| 5,446,325 | * | 8/1995 | Iwabuchi ............................. 310/67 R |
| 5,469,005 | | 11/1995 | Asama et al. ...................... 310/68 B |
| 5,486,744 | * | 1/1996 | Watanabe ............................. 318/560 |

FOREIGN PATENT DOCUMENTS 0 223 673    5/1987   (EP) .

* cited by examiner

Primary Examiner—Tran Nguyen
(74) Attorney, Agent, or Firm—Staas & Halsey LLP (57) ABSTRACT

An optimum arrangement of position detectors which is inexpensive but hardly affected by intrinsic mechanical deflection or radial displacement on a rotary structure or motor and by a secondary artifact or variation i the magnetic coupling resulting from the mechanical deflection or radial displacement. A brushless DC motor with N phases (N≧2) according to the present invention is provided having position detectors of which signal outputs are indicative of the location of magnetic poles of a rotor and used for controlling the rotation for a constant speed. More particularly, it includes any two adjacent position detectors being spaced from each other by a spatial angle θi (rad) about the center of the rotor, $(1/n)*(\theta i/2\pi)<KM$ is established where i=1 to N−1, $0<\theta i<2\pi/N$, KM is the mechanical time constant of the motor (sec), and n is the number of revolutions (rps). Since the position detectors of different phases are spatially gathered in a small region, the magnetic imbalance resulting from mechanical deflection or radial displacement is attenuated. As the result, a variation of the Hall voltage output of each position detector due to the magnetic unbalance will be minimized.

7 Claims, 9 Drawing Sheets

BRUSHLESS DC MOTOR

BACKGROUND OF THE INVENTION

1. Field of the Invention

The present invention relates to a brushless DC motor having a plurality of position detectors for detecting the position of magnetic poles on a rotor, and more particularly to a brushless DC motor which improves the DC motor characteristic like the torque ripple characteristic and the rotation unevenness characteristic, etc. by arranging the position detectors.

2. Description of the Prior Art

The brushless DC motor for floppy disk drives of personal computers have Hall sensors using a Hall effect for detecting a roter position. The task of Hall sensors is a detection of a roter's position and maintenance of roter's rotation. This task is essential for producing an optimum commutating action. It is now understood that the action and its accuracy of positioning the position detectors directly affect the operational characteristics of the motor in that sense. However, the installation of the position detectors has been determined by consideration of the general principles and concepts in conventional brushless DC motors.

Particularly, a polyphase, multipole motor provides two or more combinations of location for installation of the position detectors according to the principles and concepts. It will thus take a considerable length of time and labor to determine the best of the combinations in applicable conditions.

Figure 9:
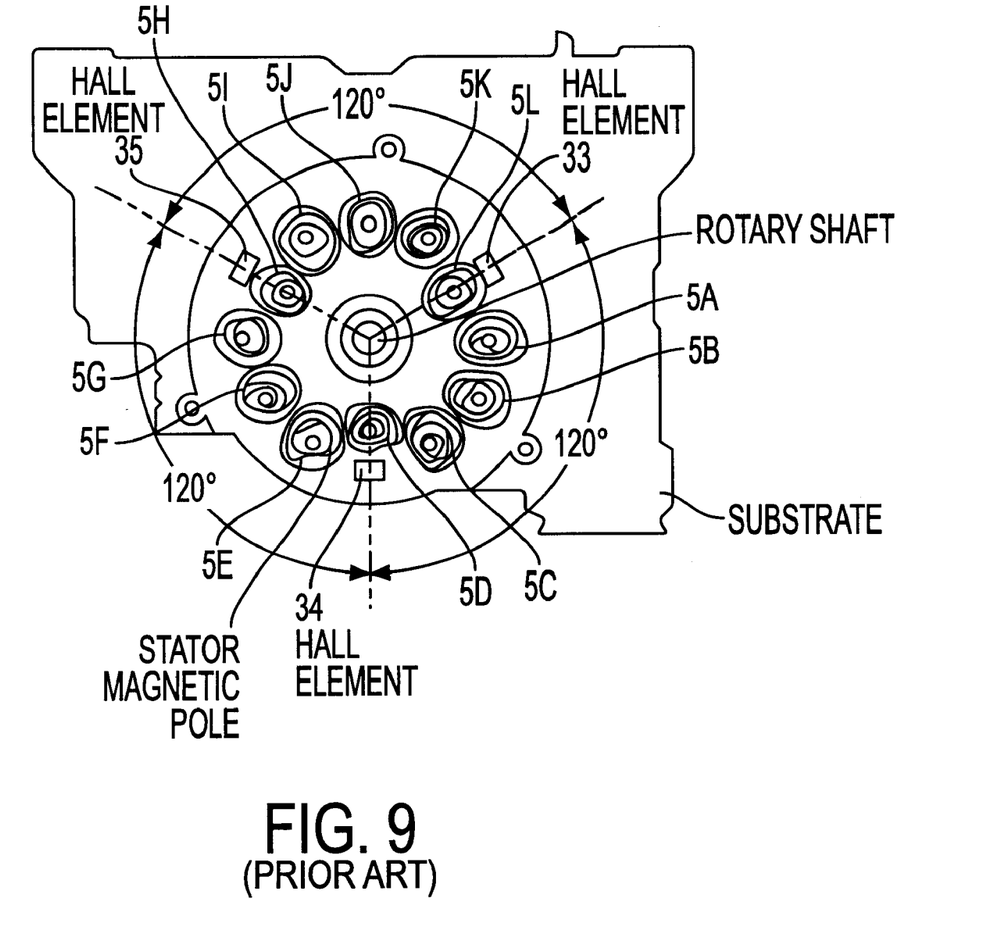
FIG. 9 is a front view showing a substrate of a stator of a prior art.

It is known that the symmetrical arrangement of the position detectors is most commonly adopted in which the mechanical balance is maintained in a system of rotating action for minimizing deflecting and eccentric movements. For example, three of the position detectors in a conventional three-phase brushless DC motor, regardless of the number of poles, are mounted at equal angular intervals of 120 degrees as shown in FIG. 9.

Such a known motor is usually designed to partially or entirely control the energization of its coils with analog voltage outputs of the position detectors. It's a big problem in the control method above that small and flat type motors easily structurally affect Hall output voltages to detect the rotor magnet position. In this common drive method, the outputs of the position detectors of phases should be uniform.

If not, the waveform of a coil driving signal produces a deviation from the timing of commutating or the amplitude in each commutating action. Accordingly, the rotor is varied in the torque depending on its rotational angle, thus increasing a nonuniformity of rotation.

SUMMARY OF THE INVENTION

The present invention is directed towards eliminating the foregoing drawbacks. It is an object of the present invention to provide an optimum arrangement of position detectors, which is inexpensive but hardly affected by intrinsic mechanical deflection, radial displacement on a rotary structure or motor, or by a secondary artifact or variation in the magnetic coupling resulting from the mechanical deflection or radial displacement.

For achievement of the above object of the present invention, a brushless DC motor with N phases (N≧2) is provided having position detectors of which signal outputs are indicative of the location of magnetic poles of a rotor and used for controlling the rotation for a constant speed. More particularly, it is characterized in that while any two adjacent position detectors are spaced from each other by a spatial angle θi [rad] about the center of the rotor, $(1/n)*(\theta i/2\pi)$ <KM is established where i=1 to N−1, 0<θi<2π/N, KM is the mechanical time constant of the motor (sec), and n is the number of revolutions (rps). The position detectors are consecutively arranged at equal intervals as located in their respective slots provided between stator magnetic poles. Preferably, the position detectors are Hall devices. Since the position detectors of different phases are spatially gathered in a small region, the magnetic imbalance resulting from mechanical deflection or radial displacement is attenuated. As a the result, a variation of the Hall voltage output of each position detector due to the magnetic imbalance will be minimized.

DESCRIPTION OF THE PREFERRED EMBODIMENTS

Figure 1:
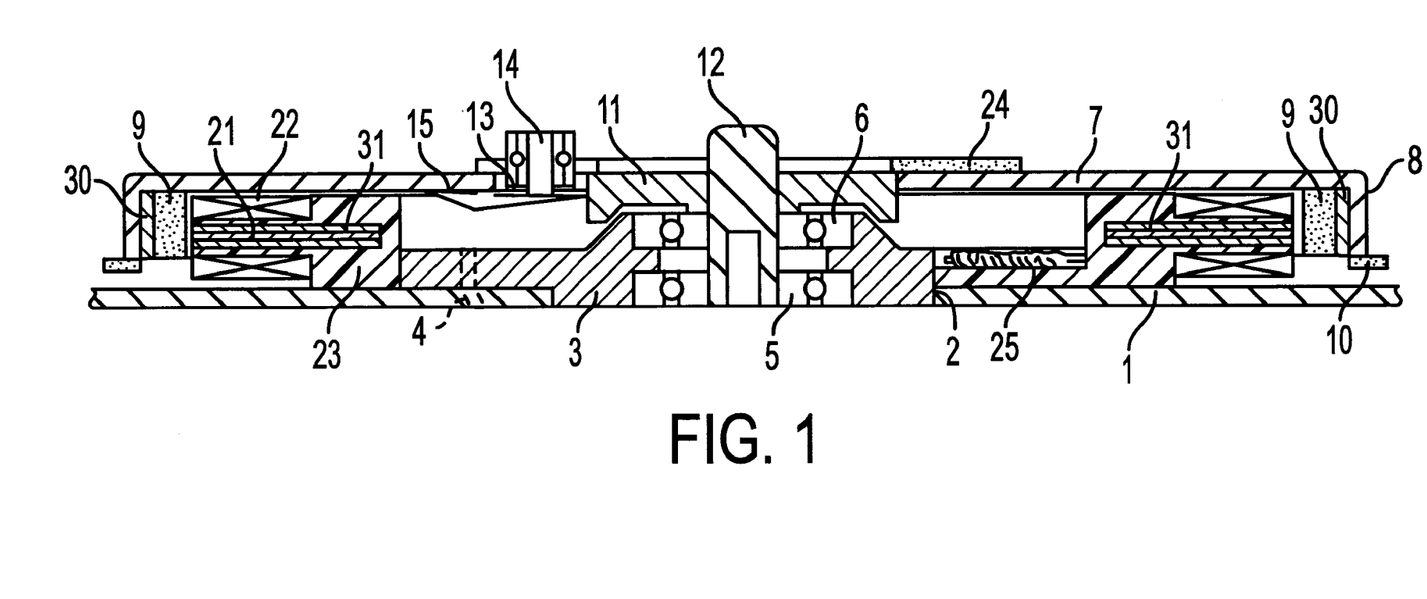
FIG. 1 is a cross sectional view showing one embodiment of the resent invention.
Figure 2:
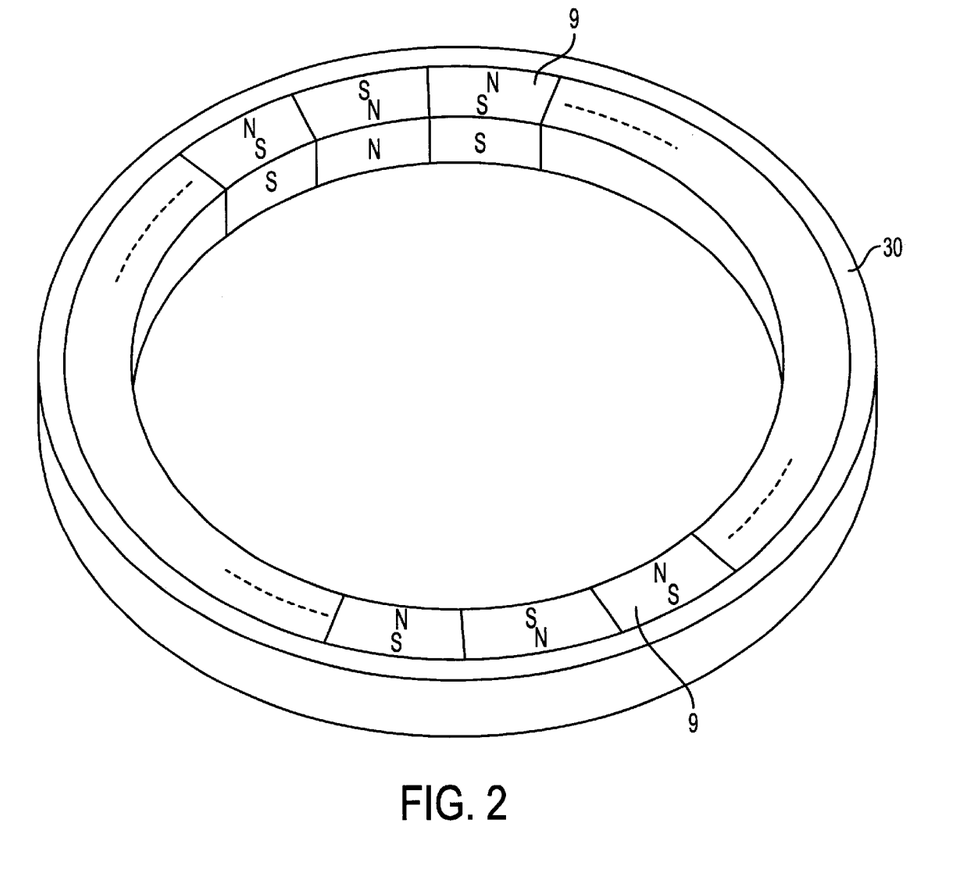
FIG. 2 is a perspective view of a rotary magnetic pole and a magnetic shield ring of the embodiment.

One embodiment of the present invention will be described referring to the accompanying drawings. FIG. 1 is a cross sectional view of a rotor rotatably mounted on a substrate 1 for a printed circuit board. The substrate 1 is made of a ferrous or ferromagnetic material which is a component of a brushless DC motor. The substrate 1 has a round opening 2 provided therethrough for accepting a bearing support 3 which is retained by a screw 4 to the substrate 1. The bearing support 3 has two ball bearings 5 and 6 fixedly mounted thereto. A disk plate 7 of a thin dish shape is provided as a part of the rotor for carrying and rotating a floppy disk. The disk plate 7 has a rotary magnetic pole 9 mounted to the inner side of an outer rim 8 thereof and consisting of a ring shaped permanent magnet. A speed detector permanent magnet 10 is fixedly mounted to the bottom of the outer rim 8 for measuring the rotating speed of the disk plate 7. The permanent magnet of the rotary magnetic pole 9 is a rare earth material and its ring shape is best shown in FIG. 2. A magnetic shield ring 30 made of soft iron is mounted to the outer side of the rotary magnetic pole 9, which comprises a plurality of magnetic regions developed by magnetization. More specifically, the magnetic regions are magnetized radially of the rotary magnetic pole 9 so that any two adjoining regions are opposite to each other in polarization. The disk plate 7 and the rotary magnetic pole 9 are assembled together constituting the rotor.

Figure 3:
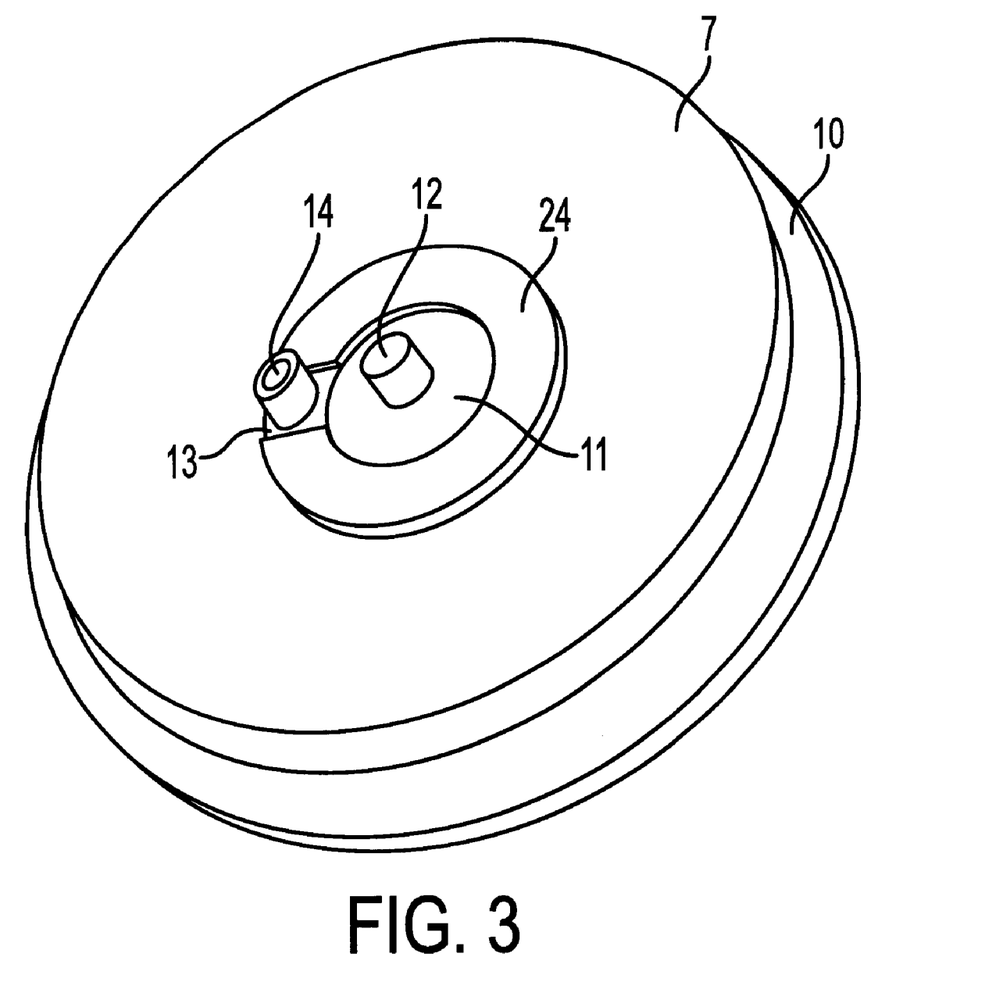
FIG. 3 is a perspective view showing the upper surface of a rotor of the embodiment.
Figure 4:
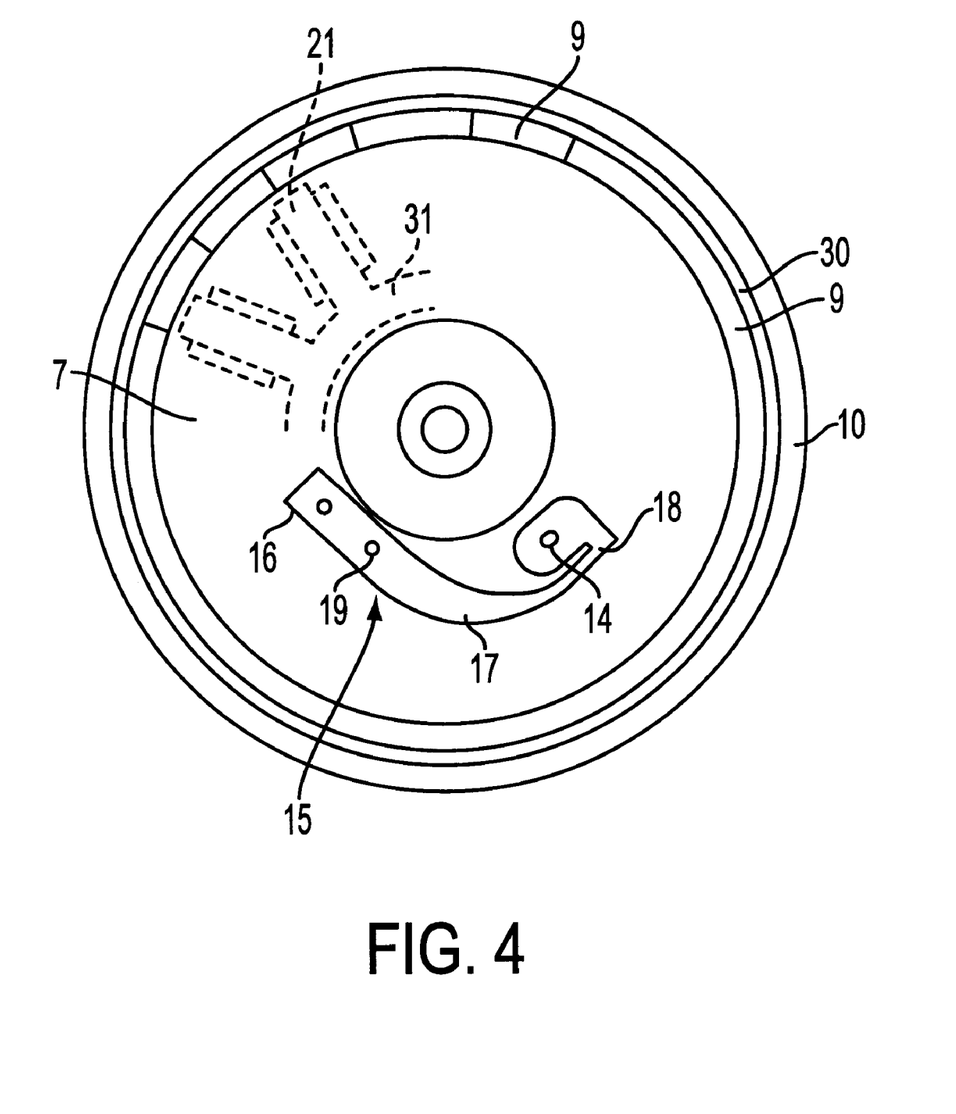
FIG. 4 is a perspective view showing the lower surface of a rotor of the embodiment.

A rotary shaft mounting center 11 made of brass is fixedly mounted to the center of the disk plate 7. A rotary shaft 12 is fixedly joined to the rotary shaft mounting center 11 and is rotatably supported by the two bearings 5 and 6. As shown in FIG. 3, a hole 13 is provided between the disk plate 7 and the mounting center 11 for clearing a drive pin 14. The drive pin 14 extending outwardly through the hole 13 is fixedly joined at bottom to one end of a leaf spring 15 mounted at the other end on the lower surface of the disk plate 7, as shown in FIG. 4. The leaf spring 15 comprises a proximal end 16, an arm portion 17, and a distal drive pin mounting end 18 arranged to have a U shape. The drive pin 14 is press fitted to the drive pin mounting end 18 of the leaf spring 15. The proximal portion end 16 of the leaf spring 15 is rivet joined by a rivet 19 to the lower surface of the disk plate 7. Also, shown in FIG. 1 are a stator magnetic pole 21, stator windings 22, and a stator frame 23 made of a synthetic resin material. An attraction magnet 24 is mounted about the rotary shaft 12 on the upper surface of the disk plate 7. The attraction magnet 24 attracts and holds a soft iron center plate of the floppy disk on the disk plate 7. FIG. 1 illustrates a terminal 25 fitted in a recess provided in the upper surface of the bearing support 3. The terminal 25 receives unshown leads extending through the stator frame 23 from their respective stator windings 22 and is further connected to a printed circuit arranged on the substrate 1. The magnetic shield ring 30 is provided for attenuating a flux of leak magnetism. There is also installed a yoke 31.

Figure 5:
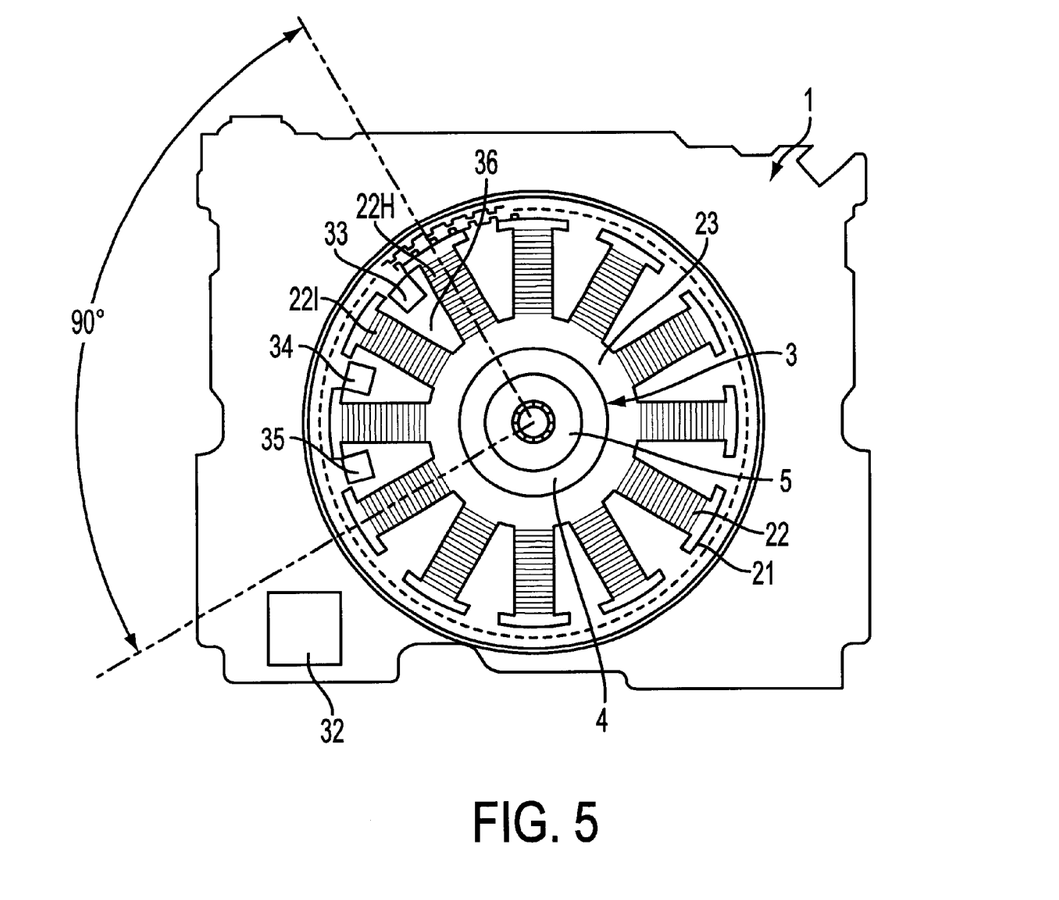
FIG. 5 is a front view showing a substrate of a stator of the embodiment.

FIG. 5 is a plain view of the brushless DC motor without the rotor. What is not shown is that the printed circuit board of the substrate 1 comprises an insulating layer bonded on a soft iron sheet and an electrical circuit designed on the insulating layer. The three-phase brushless DC motor shown is controlled by a drive IC 32 which is mounted on the substrate 1 and includes a servo speed controller.

There are provided three position detectors or Hall devices 33, 34, and 35 for detecting the location of magnetic poles on the rotor. The three Hall devices 33, 34, and 35 are required because the embodiment is a flat-type three-phase brushless DC motor. It is understood that a number of the Hall devices are needed for their respective phases. The rotating action of the motor in the embodiment is well known and will be described in no more details.

The embodiment is emphasized in that the three Hall devices 33, 34, and 35 are allocated to three consecutive slots 36 provided in the stator magnetic pole 21.

It is essential for installation of the Hall devices to be phased at 120 degrees of an electrical angle. For example, a prior art is shown in FIG. 9 where a Hall device 33 may be installed at one of four locations, on four stator windings 5H, 5K, 5B, and 5E which are arranged in 90 phase with one another. According to the embodiment of the present invention, the Hall device 33 is located between two adjacent windings 22H and 22I as followed by the other two Hall devices 34 and 35 at the closest spatial intervals (FIG. 5 showing the three Hall devices 33, 34, and 35 arranged in a row so that the spatial angle is minimized). As the result, the three Hall devices 33, 34, and 35 are located all within an angle of 90 degrees.

Figure 6:
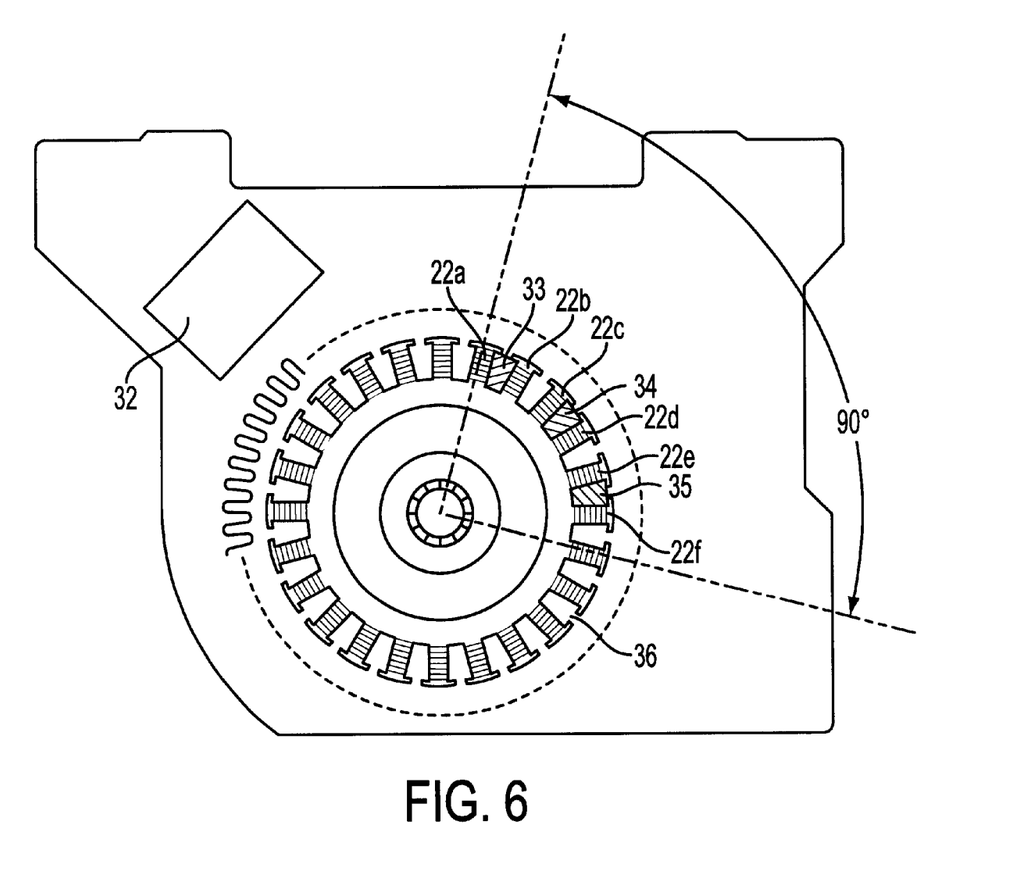
FIG. 6 is a front view showing a substrate of a stator of another embodiment.

FIG. 6 shows another embodiment of the present invention where like components are denoted by like numerals as those of the previous embodiment and will not be explained in any more detail. The second embodiment involves a three-phase DC brushless motor of a radial gap core type having 24 slots between the windings arranged opposite to 32 radially magnetized regions of a rotor magnet (not shown). The three Hall devices 33, 34, and 35 are located between their respective two adjacent stator windings 22a and 22b, 22c and 22d, and 22e and 22f similar to those of the previous embodiment, although they are not consecutive in spatial terms. The three Hall devices 33, 34, and 35 of the second embodiment are allocated to alternate slots 36 but still fallen within 90 degrees of the angle about the center point As the Hall devices are spatially gathered to a region (in a 90-degree segment of a circle in the two embodiments), any magnetic imbalance caused by mechanical deflection or radial displacement is minimized thus decreasing a variations in the Hall voltage output. In other words, the amplitude of the Hall voltage output according to the present invention will be uniform as compared with the prior art where Hall devices have more spaces therebetween.

This is explained by the fact that the mechanical deflection or radial displacement of the rotor causes an air gap to change from narrow to wide (or vice versa) in each revolution, If two Hall devices are mounted opposite to or more precisely, spaced by 180 degrees from each other, their voltage outputs will be worse in the uniformity as presumed.

Figure 7:
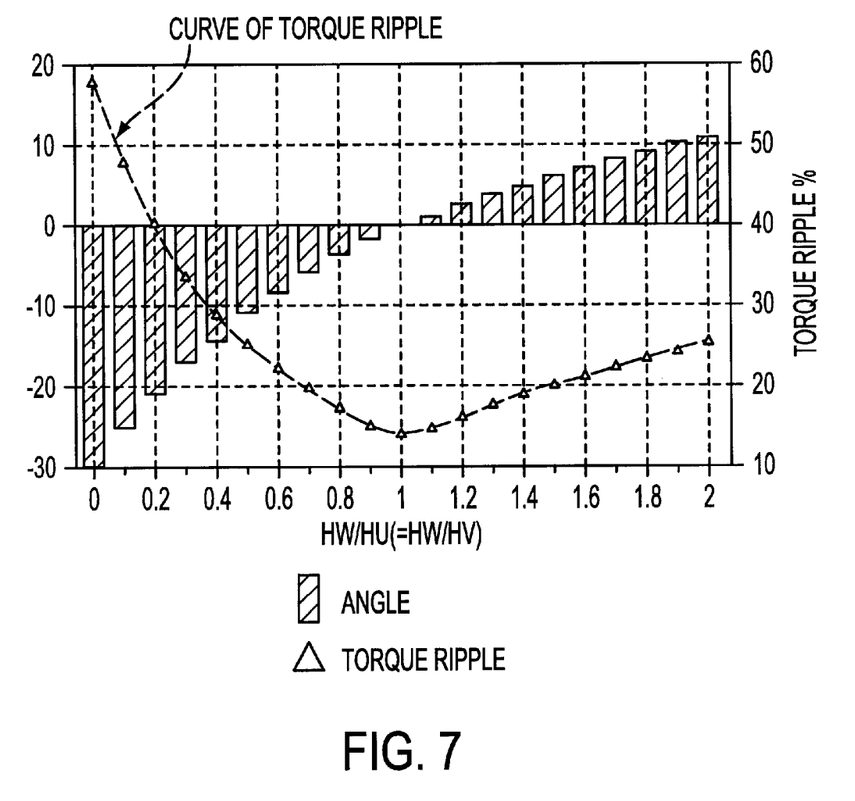
FIG. 7 is a characteristic diagram showing experimental results of the embodiment.

It was examined how the start torque of a three-phase brushless DC motor of the second embodiment is affected by a difference (of amplitude) between the voltage outputs in different phase Hall devices. The results are plotted in FIG. 7. For ease of analyzation, two of the three Hall devices were prepared to deliver the same amplitude of the voltage outputs. The voltage output of the third Hall device was measured and compared in a ratio. It is apparent from FIG. 7 that the bottom value (at minimum) of the start torque is declined when the output of the third Hall device is different from the outputs of the two other Hall devices, although the degree of declination depends on the difference of the voltage output. It is understood that the declination also affects controllability which will be described later. It was found from the experiment that radial deviation of the rotor is 100 $\mu$mpp at maximum but 50 to 60 $\mu$mpp during the normal running The maximum is however as high as 40% of the air gap which is 150 $\mu$m in design and will thus bias the voltage output of each Hall device.

It should be considered for a direct spindle motor of such a flat type as of the embodiments for floppy disk drive (FDD) application where a disk is rotated as held by the attraction of a chuck magnet(s) that a load torque is varied depending on load side conditions including location of a head, size (or type) of a disk, temperature, and moisture.

In addition, a frictional load has to be accounted as varied between the read/write head and the medium. As the loads are varied, the rotor of the motor may create a so-called surface deviation. The surface deviation will be offset by a remedy action according to the present invention The controllability is now focused. As shown in FIG. 5, if the motor of the embodiment (having 16 rotor magnetic poles and 12 stator magnetic poles) is rotated at a speed of 300 rpm, the period T of revolution is $$T=60/300=0.2(\text{sec})=200(\text{msec}).$$

The magnetic unbalance is hence performed at every 200 seconds. The problem is that the duration of the Hall device being affected by the magnetic imbalance is varied depending on its spatial distance (or angle) from another Hall device. If the spatial angle is for example 120 degrees, like in the prior art, the duration is:

$$200 \times 120/360 = 66.7 \text{ msec}$$

When it is 30 degrees like in the first embodiment, the duration is:

200×30/360=16.7 ms

It is thus clear that the duration is about ¼ of that with 120 degrees of the spatial angle.

This is interpreted as an advantageous effect of the present invention that the magnetic imbalance is shifted to high frequency for the Hall device (the first embodiment allowing a shift to high frequency by 4 times greater than with the angle of 120 degrees). Although the shift to high frequency is appreciated with relation to a mechanical time constant of the motor, it is easily controlled by inertial effects of the motor. The involvement of the mechanical time constant will be explained below in more details.

Figure 8:
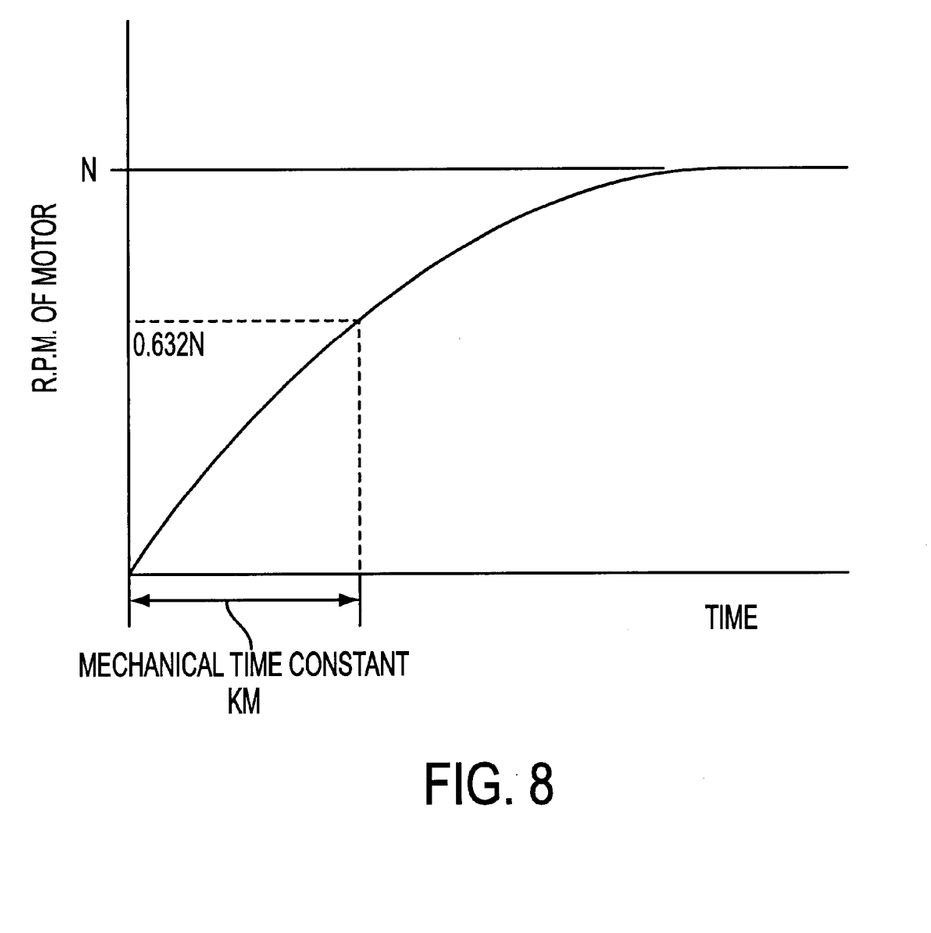
FIG. 8 is a characteristic diagram explaining a motor time constant of the embodiment.

The mechanical time constant of the motor is calculated from the fact that application of a given voltage to the motor increases exponential-functionally the number of revolution with time as shown in FIG. 8 until it reaches N. The time constant is equal to a duration of the number of revolution increasing from 0 to 63.2 (more precisely, (e−1)/ex 100 where e is the base of a natural logarithm) percent of N, representing a response to the rotation. When the mechanical time constant is small, the response to the rotation is increased in speed thus providing a faster controlling action. If it is large, the response is delayed retarding the controlling action.

In another point of view, the motor can hardly be controlled faster than the mechanical time constant. It is thus essential to maintain any disturbance of control within a duration (of high frequency) shorter than the mechanical time constant. There are 2 types spindle motors for 3.5 inch FDD. One is a big and thick one which has low performance magnet such as ferrite material to be lower cost. Another is a small and thin one which has high performance magnet such as rare earth material making it possible to be set used in small and thin personal computers.

So the mechanical time constant in the embodiments of the present invention is classified into two, large and small, types; 140 to 160 ms for large type application and 25 to 40 ms for small type application. More specifically, the first embodiment of the large type provides a time difference of 16.7 ms between the two Hall devices thus establishing the mechanical time constant >> the time difference (140 to 160 ms>> 16.7 ms). Therefore, any drawback due to the magnetic imbalance derived from the rotating action will be eliminated. In the small type, the mechanical time constant is also greater than the time difference (25 to 40 ms>16.7 ms) as improved more than with 120 degrees of the spatial angle in the prior art. The prior art allows the mechanical time constant to be smaller than the time difference (25 to 40 ms<67.7 ms).

The position detectors are not limited to those described in the two embodiments but may be of a pickup coil type. Also, further changes and modifications will be possible without departing from the scope and spirit of the present invention as they reside in the claims of the present invention.

As set forth above, the advantages of the present invention are:

1) that the motor adversities (including start torque ripple and rotational inconsistency) are minimized without increasing the cost.
2) that the magnetic imbalance on the rotor (with magnets) produces a less effect thus allowing the controllability to be increased.
3) that the position detectors are gathered in a specific region thus allowing ease of cable connection and providing uniform interconnecting wirings between different phases.
4) that the position detectors are gathered in a specific region and their dislocation (in an angular or radial direction) will easily be identified.
5) that the rotating action is maintained uniform and a degree of radial displacement causing the magnetic imbalance will be permitted due to a wider allowance.

What is claim is:

1. A brushless DC motor with N phases, where $N \geq 2$, having position detectors from which signal outputs are indicative of the location of magnetic poles of a rotor, controlling the rotation for a constant speed, comprising:

N position detectors disposed between magnetic poles, wherein any two adjacent position detectors are spaced from each other by a spatial angle $\theta i$ in radians about a center of the rotor, $(1/n)*(\theta i/2\pi)<KM$ is established, where i=1 to N−1, $0<\theta i<2\pi/N$, KM is the mechanical time constant of the motor (sec), and n is the number of revolutions (rps).

2. A brushless DC motor according to claim 1, wherein the relation between the number of revolutions n (rps) and the mechanical time constant KM (sec) is expressed by:

$1/n > KM$.

3. A brushless DC motor according to claim 1, wherein N−1 of the spatial angles defined between the position detectors are consecutively arranged at equal intervals about the center of the rotor.

4. A brushless DC motor according to claim 1, wherein the position detectors are located in their respective slots provided between stator magnetic poles.

5. A brushless DC motor according to claim 1, wherein the position detectors are Hall devices.

6. A brushless DC motor according to claim 1, characterized for use in a floppy disk drive.

7. A brushless DC motor according to claim 5, characterized of a flat type.

* * * * *

UNITED STATES PATENT AND TRADEMARK OFFICE
CERTIFICATE OF CORRECTION

PATENT NO. : 6,320,288 B1
DATED : November 20, 2001
INVENTOR(S) : Yuzuru Suzuki et al.

It is certified that error appears in the above-identified patent and that said Letters Patent is hereby corrected as shown below:

Title page,
Item [57], ABSTRACT, line 6, change "N>2" to -- N>2 --.

Column 1,
Line 63, change "(N>2)" to -- (N>2) --.

Column 2,
Line 12, delete "the" first occurrence.

Column 4,
Line 20, delete "the".
Line 59, change "unbalance" to -- imbalance --.
Line 59, delete "at".

Column 5,
Line 14, change "inertial" to -- inertia --.
Line 37, change "to be" to -- making it --.

Column 6,
Line 24, change "N>2" to -- N>2 --.

Signed and Sealed this

Nineteenth Day of March, 2002

Attest:

Attesting Officer

JAMES E. ROGAN
Director of the United States Patent and Trademark Office